United States Patent Office 3,522,401
Patented Aug. 4, 1970

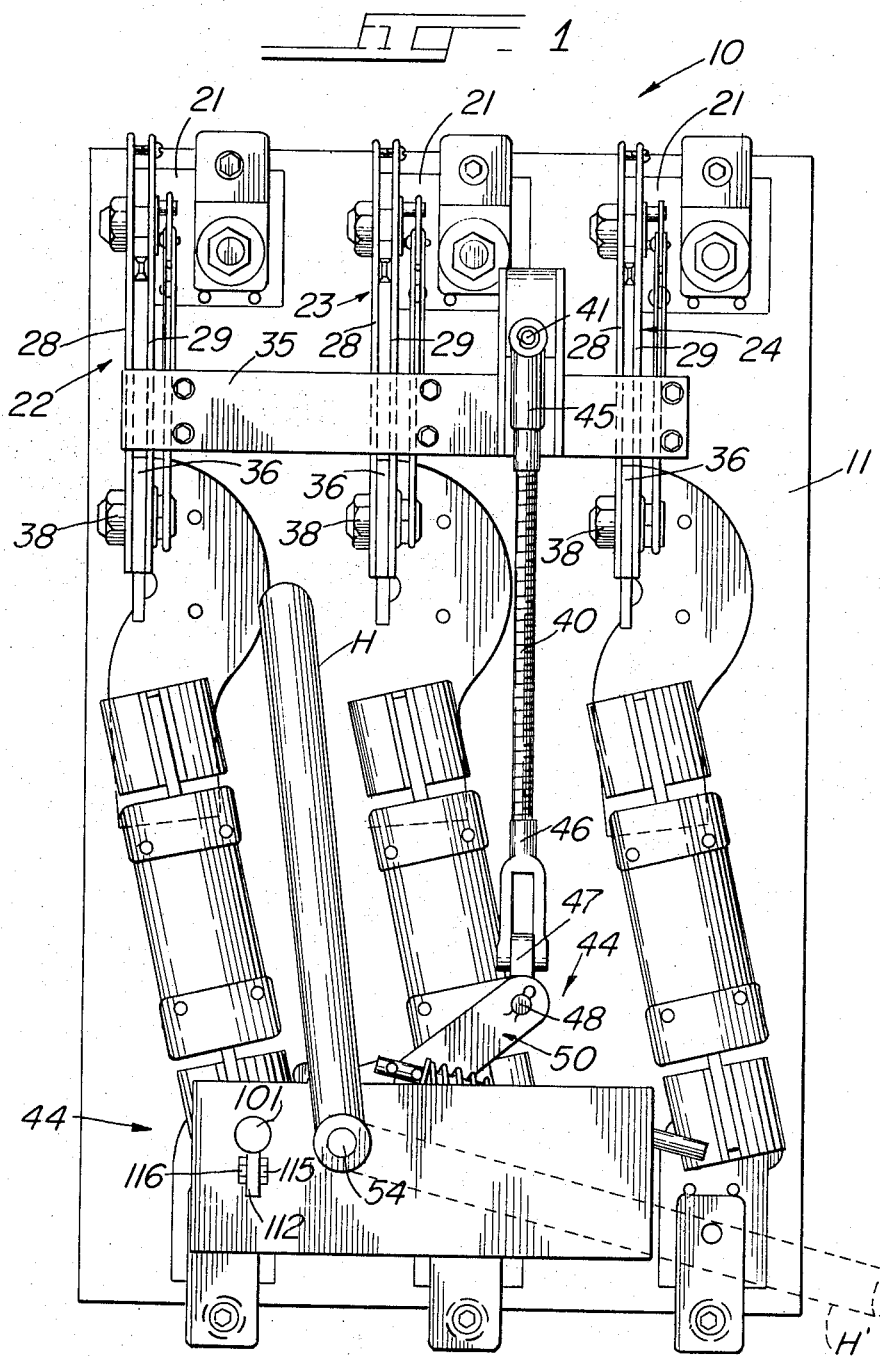

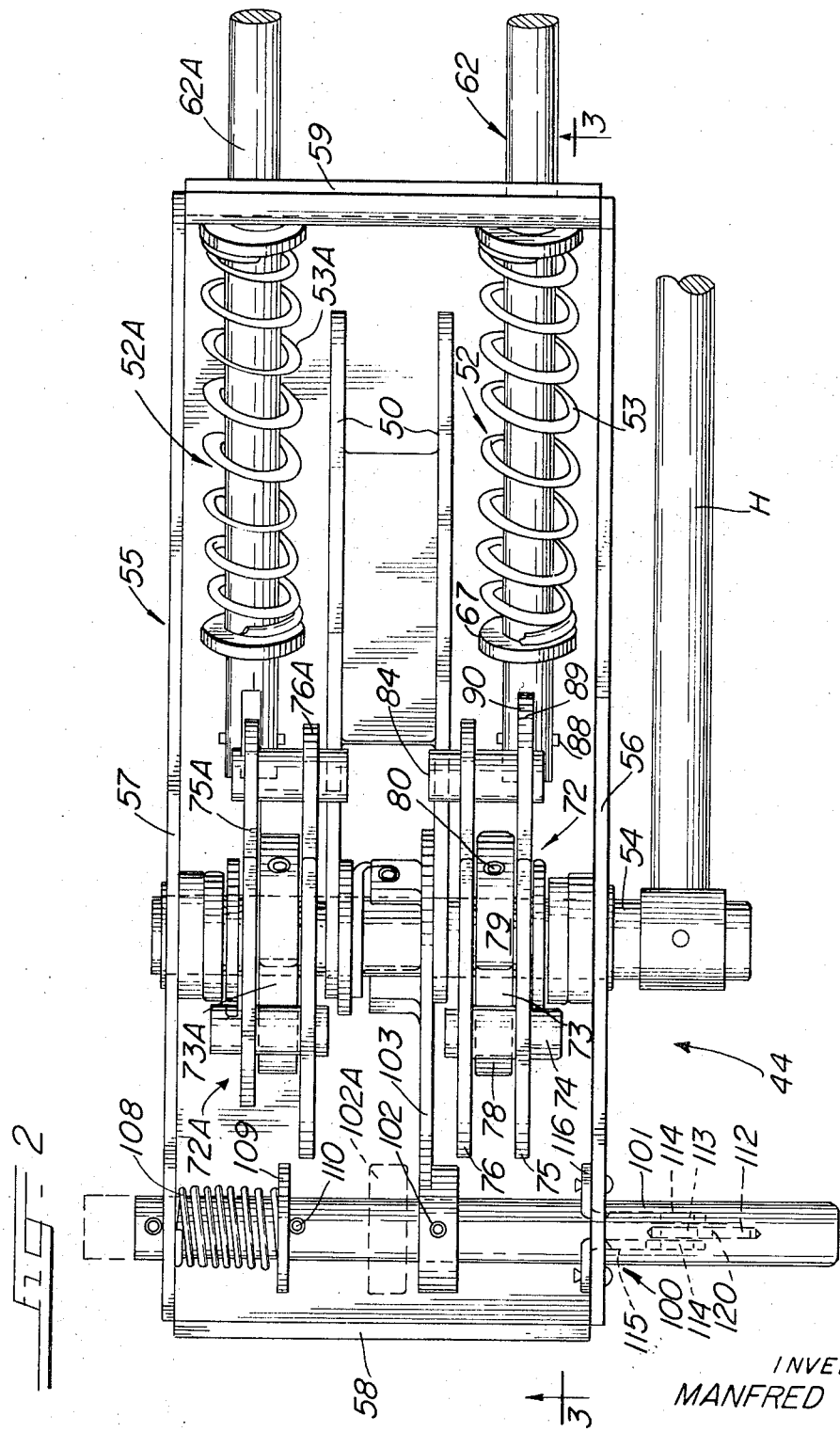

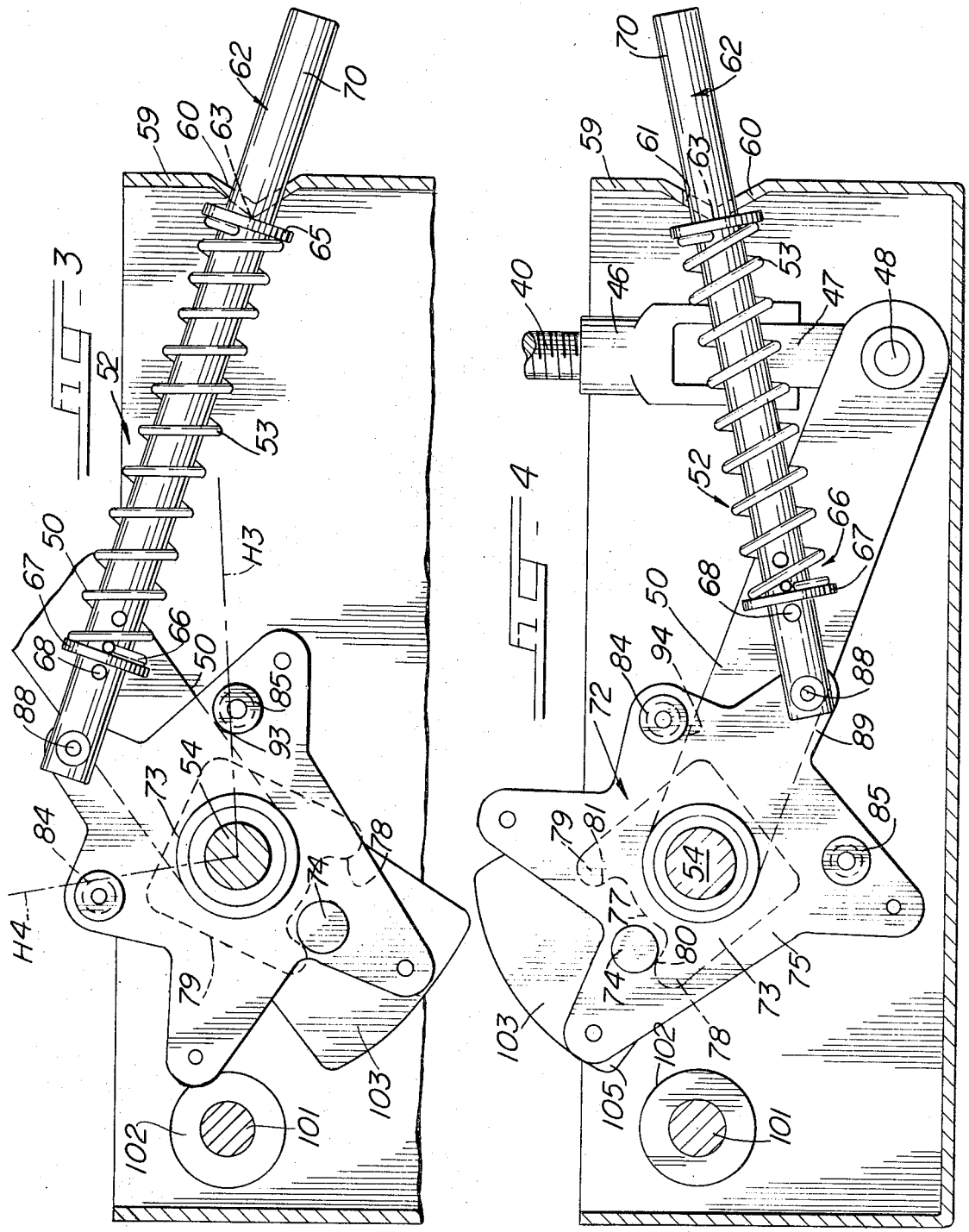

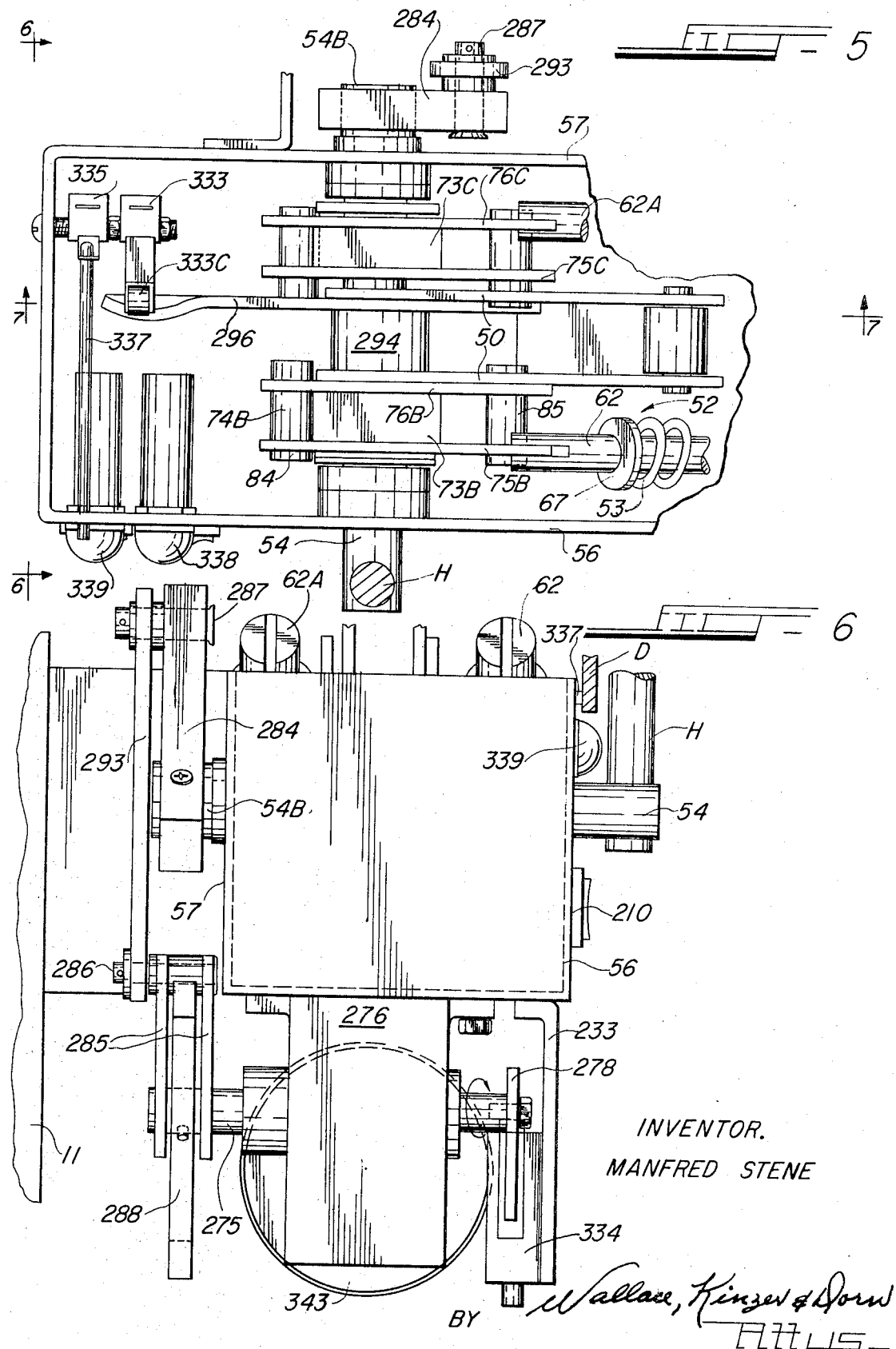

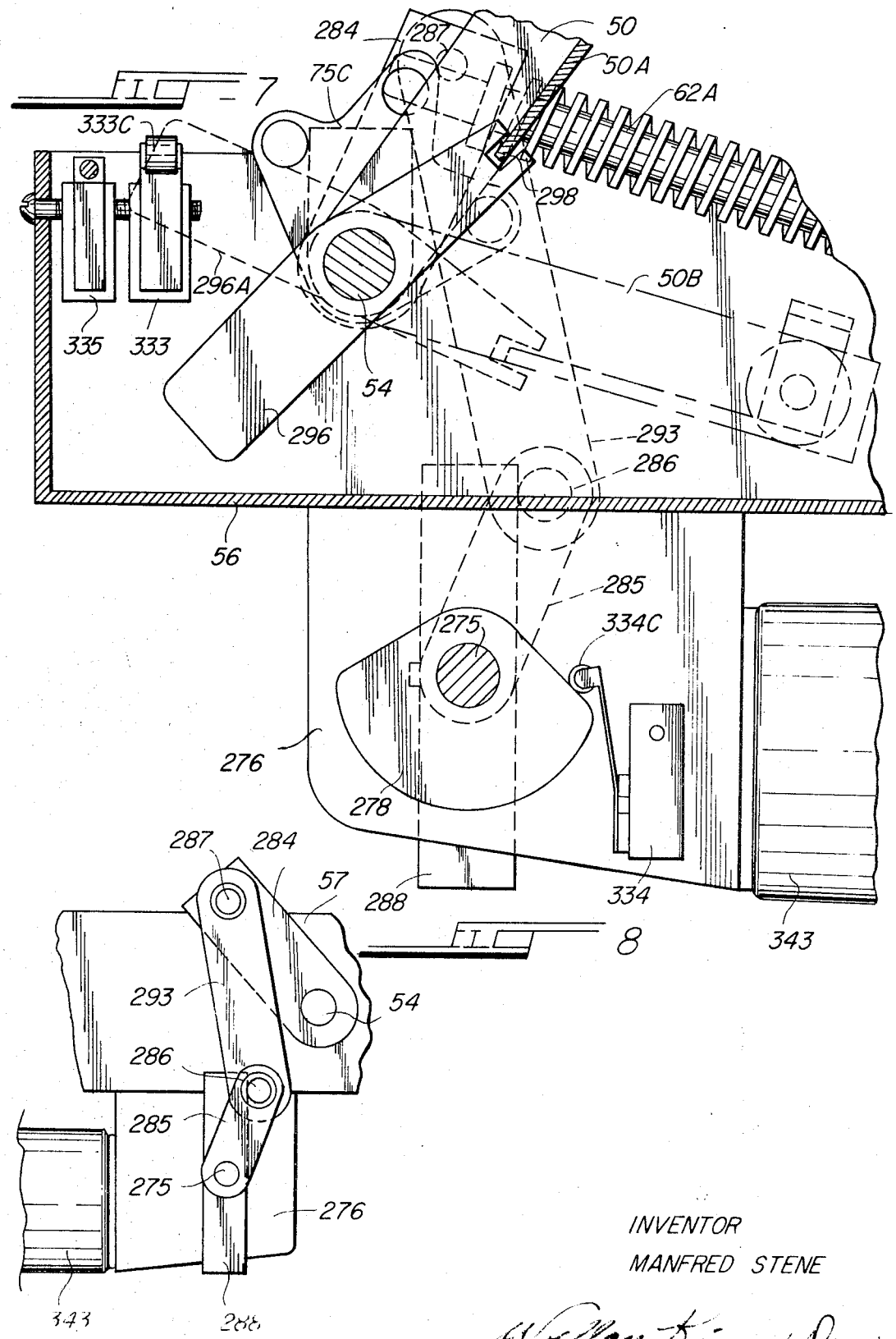

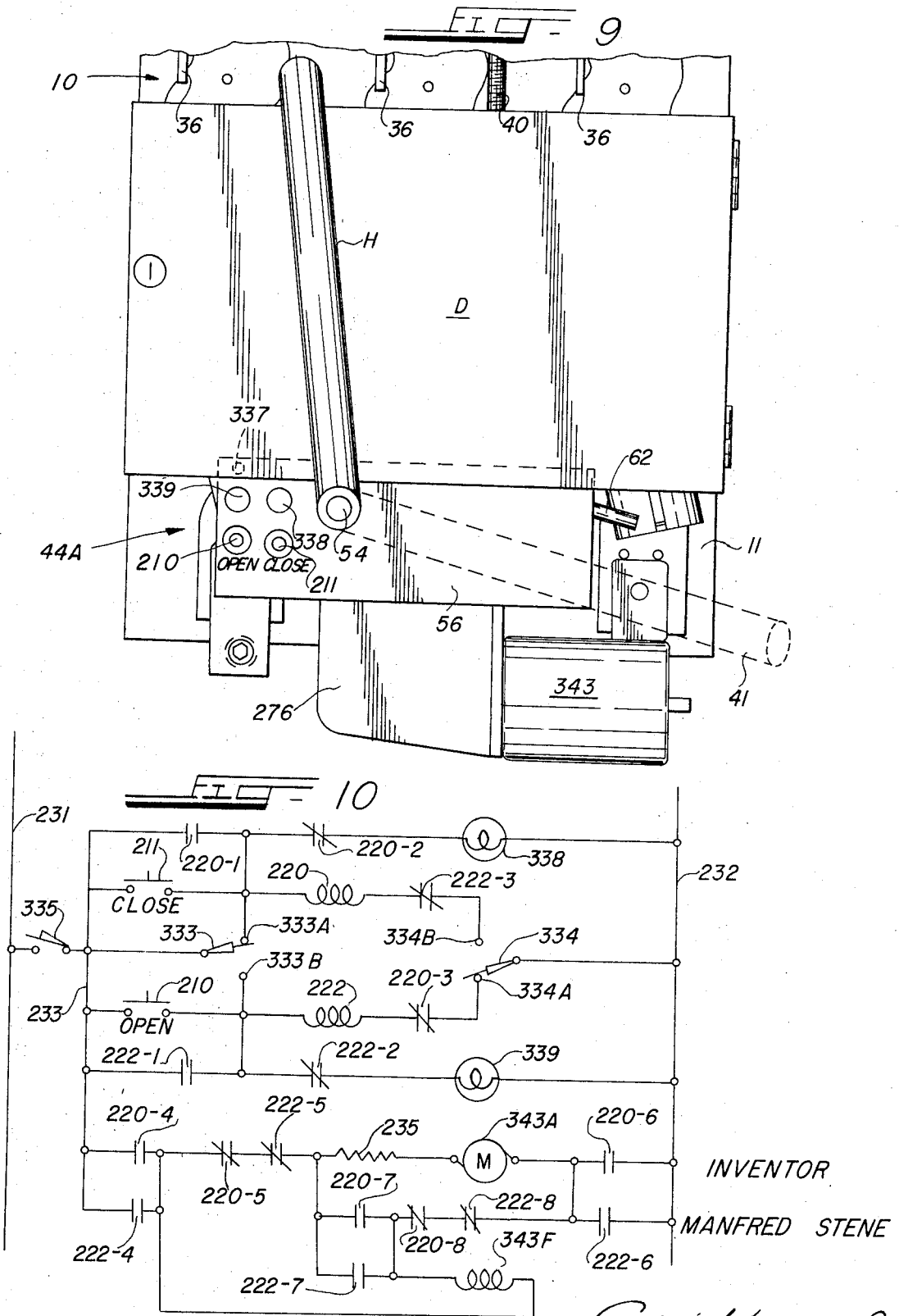

3,522,401
MANUAL MOTOR ACTUATED OPERATING MECHANISM FOR ELECTRICAL SWITCHES
Manfred Stene, Chicago, Ill., assignor to Erickson Electrical Equipment Co., Chicago, Ill., a corporation of Illinois
Continuation-in-part of application Ser. No. 555,621, June 6, 1966. This application Sept. 1, 1967, Ser. No. 667,044
Int. Cl. H01h 3/26
U.S. Cl. 200—153          8 Claims

ABSTRACT OF THE DISCLOSURE

A switch operating mechanism for opening and closing the movable contacts of a load break pressure contact switch that can be actuated either manually or by an electrical motor on an interchangeable basis. The operating mechanism comprises a main shaft with a handle attached thereto for rotating the shaft in opposite directions through an arc of little more than ninety degrees between switch-open and switch-closed positions. Motor operation is effected by a drive linkage comprising a motor lever fixed to the main shaft and pivotally connected to a connecting link, the connecting link at its opposite end being pivotally connected to a drive crank journalled on the shaft of a drive motor. The motor rotates in only one direction and does not interfere with manual operation of the mechanism through the handle to either closed or open position. The motor circuit is interlocked with a door covering a part of the electrical switch apparatus to prevent energization of the motor whenever the door is open and to prevent opening of the door if the electrical switch is closed.

CROSS-REFERENCE TO RELATED APPLICATION

This application is a continuation-in-part of application Ser. No. 555,621 filed June 6, 1966, which is being abandoned in favor of the present application.

BACKGROUND OF THE INVENTION

This invention relates to a new and improved switch operating mechanism particularly intended for use with load break pressure contact switches, adapted to either motor or manual operation.

Fused load break pressure contact switches are frequently used as service entrance equipment and in other relatively high current applications. Typically, switches of this kind may be used in multipole switching applications requiring interruption under load of currents of the order of 400 to 6,000 amperes. In such switches, it is critically important that the contacts open and close rapidly to minimize arcing and thereby avoid pitting and deterioration of the contact members. Most switches of this kind are provided with a latching mechanism for each pole of the switch to secure the contacts in closed position and prevent any accidental opening of the switch due to external shocks or other factors. The switch blades are relatively heavy and the mechanical forces involved in opening and closing of the switch may be substantial.

Because of the wide range of current requirements that may be imposed upon service entrance equipment and like switching applications, due to varying load requirements, it has usually been necessary to design and construct substantially different switch mechanisms in order to cover the complete load range. This leads to substantial expenses with respect to design and engineering of the switch mechanisms and also requires the manufacture and stocking of a large number of parts to permit construction of switches of varying size. As a consequence, although such switches are not constructed on a custom basis, manufacturing expense may be relatively high in relation to the rather simple nature of the basic switching mechanisms.

Service entrance switches and other related switching devices are ordinarily manually operated, though motor operation is frequently provided. But spring mechanisms for accelerating the speed of opening and closing of the switches may produce mechanical reactions in the manual operating devices that could shock and even injure a switch operator. The same mechanical reactions can damage a motor drive linkage. It is also necessary to protect against the possibility of a hang-up at some intermediate position between the full open and full closed positions of the spring. This is particularly critical with respect to the conventional latching type of switch, in which the closing movement of the switch must be completed in order to latch the switch contacts in closed position. It is characteristic of operation of switches of this kind that the movable blade contacts, on being closed, first engage the fixed contacts of the switch to establish initial electrical contact, subsequently move further into broad surface contact with the fixed switch contacts, and then actuate the latch mechanism when the blades are completely closed.

Motor actuated load break pressure contact switches present additional difficulties, particularly if manual operation is also required. The motor drive may become a source of danger to a workman if energized while he is throwing the switch manually or if actuated to close the switch while fuses are being replaced or other work is taking place adjacent the switch. The motor drive may get out of step with the switch operating mechanism if the switch is thrown manually. There is also a need for positive indication of the position of the switch under all circumstances, regardless of the condition of the motor drive.

SUMMARY OF THE INVENTION

One object of the invention is to provide a new and improved operating mechanism for a load break pressure contact switch that is of modular construction and permits use of the same parts in construction of switches of substantially different sizes adapted to carry widely varying loads.

A specific object of the present invention is to provide a new and improved operating mechanism for a load break pressure contact switch that gives a substantial degree of independence in the energy requirements with respect to closing and opening of the switch. A related feature of the invention is a new and improved spring-powered operating mechanism for a load break pressure contact switch that may be actuated manually or by motor and that is inherently and substantially completely protected against any shock or injury to the switch operator or to the motor drive.

Another object of the invention is to avoid any possibility of hang-up at an intermediate position, in the operation of a manual or motor actuated mechanism for opening and closing a load break pressure contact switch.

A particular feature of the invention is a new and improved load break pressure contact switch operating mechanism that affords a spring drive for the complete closing movement of the switch contacts, yet affords direct manual or motor actuated opening of the same switch contacts to a point at which disengagement is almost achieved, followed by rapid spring-actuated movement of the switch blades clear of the fixed switch contacts.

A specific object of the invention is to afford a load break pressure contact switch operating mechanism that is not dependent upon spring action to assure full travel for closing or for opening of the switch.

A further feature of the invention is a particular drive linkage between a drive motor and a spring-powered switch operating mechanism, which affords only an indirect drive connection so that there is no interference with manual actuation of the mechanism. The drive linkage includes a double-ended lever, connected to the motor, that drives the mechanism between open and closed positions, without requiring reversal of the motor.

An additional feature of the invention is the utilization of the operating handle of a manual motor actuated switch operating mechanism as an interlock element to prevent energization of the drive motor under certain operating conditions and as an indicator of the switch position, without endangering a workman working on or around the switch.

A further feature of the invention is an automatic catch-up circuit for keeping the motor drive of a manual-motor actuated switch operating mechanism in step with the actual switch position when the switch is thrown manually.

Other and further objects and features of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

BRIEF DESCRIPTION OF THE DRAWINGS

FIG. 1 is a front elevation view illustrating a manually-actuated switch operating mechanism constructed in accordance with one embodiment of the invention for operating a switch of known construction;

FIG. 2 is a plan view of the manual switch operating mechanism, drawn to a larger scale than FIG. 1;

FIG. 3 is a sectional elevation view, partially cut away, of the manual switch operating mechanism, taken approximately along line 3—3 in FIG. 2, with the operating mechanism in its closing position;

FIG. 4 is a sectional view, like FIG. 3, showing the switch operating mechanism in its open switch position;

FIG. 5 is a plan view, like FIG. 2, of a modification of the invention arranged for both motor and manual actuation;

FIG. 6 is an end elevation view taken approximately along line 6—6 in FIG. 5;

FIG. 7 is a sectional elevation view taken approximately along line 7—7 in FIG. 5;

FIG. 8 is a detail view of the motor connecting linkage;

FIG. 9 is a front elevation view of a part of the electrical switch, using the mechanism of FIGS. 5-8; and FIG. 10 is a schematic diagram of an electrical control circuit for the operating mechanism of FIGS. 5-9.

FIG. 1 illustrates a load break pressure contact switch 10, of known construction, in its closed condition. Switch 10 includes a base member 11 fabricated from a suitable insulating material. Across the top of base 11 there are mounted three spaced fixed contact members 21. Each of the fixed contact members is provided with an outwardly projecting contact blade and each is provided with individual terminal lugs constituting input terminals for switch 10.

Each of the fixed contacts 21 is one element of a pole for the switch 10. The fixed contacts are engageable by three movable contacts 22, 23 and 24. Each of the movable contacts of the switch comprises a pair of contact blades 28 and 29. Each set of contact blades 28 and 29 is pivotally mounted upon an electrical connector bracket 36 by means of a suitable pivot member constituting a bolt 38. The same construction is provided for each of the three movable blade contacts of the switch.

Switch 10 further includes an actuating bar 35 that extends transversely of the switch mechanism and that is also pivotally mounted upon the three fixed contact brackets 36 by means of the three bolts 38. The actuator bar 35 is connected to each of the movable contacts 22–24 by means of a connecting linkage so that pivotal movement of the bar 35 with respect to the aligned pivot pins or bolts 38 drives the movable contacts of the switch to move pivotally into and out of engagement with the fixed switch contacts 21. Switch 10 is also provided with appropriate overload fuses and electrical connectors to afford a means to complete electrical connections to the movable switch contacts.

Switch 10, as thus far described, corresponds in construction to the load break pressure contact switch described and claimed in United States Letters Pat. No. 3,213,247. The present invention is not directed to the switch structure per se, but pertains to the operating mechanism 44 that is incorporated in the switch 10 and that is utilized to open and close the switch. The invention should not be construed as limited to the particular load break switch of Pat No. 3,213,247, which is merely illustrative of a number of different forms of switch in which the invention may be incorporated.

The actuating bar 35 of switch 10 is connected to a generally vertically directed operating rod 40 by means of a pivotal connection 41. More specifically, rod 40 has its upper end threaded into an upper yoke 45 and its lower end threaded into a lower yoke 46. The lower yoke 46 is pivotally connected to a short link 47 which in turn is pivotally connected by a shaft or pin 48 to an operating lever 50 that is a part of the operating mechanism 44. In FIG. 1, the operating lever 50 is shown in its upper or closed-switch position with the manually operable handle H of the switch operating mechanism 44 disposed at an angle of approximately 100° counterclockwise from the horizontal. Pivotal movement of handle H from the solid line position of FIG. 1 to the dash line position H' turns lever 50 in a clockwise direction and pulls the drive rod 40 downwardly to pivot actuating bar 35 outwardly and away from switch base 11. This pivotal movement of bar 35 simultaneously pivots the movable contacts 22, 23 and 24 outwardly from the fixed contacts 21 and the base member 11 and thus opens the switch. It should be noted that the angular extent of the arcuate movement of bar 35 does not necessarily correspond to the arcuate movement of the switch contacts; in a typical instance, bar 35 may move through an arc of approximately 90° whereas the blade contacts of the switch are pivoted only through an angle of approximately 45°. However, this differential is not critical to the operation of the present invention and is a matter of design choice insofar as the construction of the switch contacts is concerned.

The number of poles in the switch 10, as well as the size of the contact elements of the switch, may be varied for different applications. However, for all switches of this general kind it is essential that the contacts separate rapidly and close rapidly in order to prevent excessive arcing, which would otherwise limit the useful contact life quite severely.

The internal construction of switch operating mechanism 44 is best shown in FIGS. 2–4. As shown therein, the switch operating mechanism comprises an over center spring means 52 that is utilized to actuate the switch 10 in a quick-make quick-break operation as described more fully hereinafter. The over center spring means 52 also biases the switch operating mechanism either to the closed switch position of FIG. 3 or to the open switch position of FIG. 4.

The toggle action spring means 52 includes a central shaft 54 to which the manually operable handle H is directly attached, as shown in FIG. 2. Shaft 54 is journalled for rotation within a housing 55 having front and rear walls 56 and 57 and end walls 58 and 59. Lever 50 is freely pivotally mounted on the shaft. Housing 55 is also provided with an appropriate cover and is preferably totally enclosed except for an opening necessary to provide access to fuses behind the operating lever 50, FIG. 1. The cover is not critical to the invention and has been omitted from the drawings.

The one end wall 59 of housing 55 is formed with an inwardly directed embossure 60 having an aperture 61 through which a drive rod 62 projects. The apex 63 of the pyramidal-shaped embossure 60 serves as a fulcrum point for pivotal movement of drive rod 62 between the positions illustrated in FIGS. 3 and 4. A collar 65 is freely slidably mounted on the right-hand portion of drive rod 62, within housing 55, and is maintained in engagement with the apex 63 of embossure 60 by a spring 53 that is disposed in encompassing relation to rod 62.

The left-hand end 66 of spring 53 engages a collar 67. Collar 67 is held in fixed position upon drive rod 62 by the spring and by a pin 68 that prevents axial movement of collar 67 to the left along the drive rod as seen in FIGS. 3 and 4.

Operating mechanism 44 further includes a lost motion connecting means 72 that affords an operating connection between handle H and spring means 52. The lost motion connection means 72 comprises a cam member 73 that is affixed to shaft 54 for rotation with the shaft by appropriate means such as a pin 80. Cam 73 has a generally U-shaped opening 77 formed between two cam projections 78 and 79 (FIGS. 3 and 4).

The lost motion means 72 further comprises a pair of opposed cam follower plates 75 and 76. These cam follower plates are rotatably mounted upon shaft 54. The cam follower plates 75 and 76 are spanned by a pair of stop pins 84 and 85 and by a cam pin 74. Cam pin 74 extends through the U-shaped opening 77 of cam 73 in position for engagement by either of the cam projections 78 and 79. The cam follower plate 75 is pivotally connected to the left-hand end of drive rod 62 by means of a pin 88, the connection being made on a finger-like extension 89 on the cam follower plate. As best shown in FIG. 2, the end of drive rod 62 is bifurcated at 90 to receive the extension finger 89 of the cam plate.

The switch operating mechanism 44, particularly as illustrated in FIG. 2, is intended for use with a rather high amperage switch, a switch in the middle range of those normally utilized in heavy-duty service entrance requirements and similar applications. To afford the necessary operating power for toggle action of the switch operating mechanism, as described more fully hereinafter, mechanism 44 is provided with a second over center spring means 52A, including a drive rod 62A and spring 53A, that is a substantial duplicate of the over center spring means 52 described above. The second over center spring means 52A is pivotally connected to a cam follower plate 75 that is paired with another cam follower plate 76A as a part of a second complete lost motion means 72A. Lost motion means 72A includes a cam 73A that is fixedly mounted upon the shaft 54 of the switch operating mechanism. As before, the cam follower plates are rotatably mounted upon the shaft. As will be seen from FIG. 2, the lost motion means 72A is a substantial duplicate of the lost motion means 72 described above.

If necessary, a third or fourth section can be added to the switch operating mechanism 44 to accommodate even larger switches. It is thus seen that the switch operating mechanism of the invention provides for a modular construction to permit utilization of duplicate parts in mechanisms that can accommodate switches operable over a wide range of load currents. By way of example, the switch operating mechanism of the present invention can be increased in size or decreased in size, as desired, to provide effective operation for switches used over a range as wide as 400 to 6000 amperes.

Switch operating mechanism 44 further includes a latching means 100 for locking the switch operator in its open position or in its closed position. Latch means 100 comprises a detent shaft 101 that extends across housing 55 from front to rear (see FIG. 2), being slidably mounted in the front and rear walls 56 and 57 of the housing. A detent collar 102 is fixedly mounted upon detent shaft 101 for axial movement with the shaft. Collar 102 is positioned to engage a latch cam 103 that is fixedly mounted upon the main shaft 54 of the operating mechanism for rotation with that shaft. A compression spring 108 mounted on detent shaft 101 and interposed between the rear housing wall 57 and a washer 109 biases the detent shaft forwardly of the operating mechanism and normally maintains the shaft in the position shown in solid lines in FIG. 2. Thus, with shaft 101 in the position shown in FIG. 2, the detent collar 102 blocks rotational movement of cam 103 and prevents rotation of the cam from the position of FIG. 3 to that of FIG. 4 or vice versa. A pin 110 is used to maintain washer 109 in fixed axial position on the detent shaft.

At the forward end of detent shaft 101, the lower end of the shaft as seen in FIG. 2, a locking plate 112 is mounted upon the detent shaft. Plate 112 projects between a pair of fixed bracket members 115 and 116 mounted on the front housing wall 56. The locking plate 112 is provided with a transverse aperture 113 that is aligned with corresponding apertures 114 in the brackets 115 and 116 when the detent shaft is in the normal position as shown in FIG. 2. Thus, a padlock hasp can be inserted through apertures 113 and 114 to lock the detent shaft 101 in its normal position.

To permit actuation of the switch, as described hereinafter, detent shaft 101 is moved inwardly of housing 55 to the position shown in dash lines in FIG. 2, moving the detent collar 102 to the position 102A where it is clear of cam 103. The locking plate 112 is provided with a second aperture 120 that becomes aligned with the bracket apertures 114 when the detent shaft is pushed inwardly of the operating mechanism housing. Thus, a padlock hasp or other member can be inserted through the apertures to retain the detent mechanism 100 in its released condition and enable the switch operator to use both hands on the handle H in actuating the operating mechanism 44.

In considering the operation of mechaism 44, it may first be assumed that switch 10 is open. Under these circumstances, the handle H is in the position indicated by the dash outline H' in FIG. 1. The operating mechanism 44 is in the condition illustrated in FIG. 4, in which the switch-open handle orientation is indicated by the phantom line H1. In order to close the switch, the operator first removes any padlock or other latching element that may have been used with the detent mechanism 100 and presses the shaft 101 inwardly of housing 55. The operator then locks up the detent mechanism in its alternate position with the detent collar 102 in position 102A (FIG. 2) clear of cam 103.

The operator then pivots handle H in a counterclockwise direction from the initial alignment indicated by the phantom line H1 in FIG. 4. At the outset, the resulting counterclockwise rotational movement of shaft 54 causes only the cam members 73 and 103 to rotate, since there is as yet no driving connection between the handle and the remaining components of the switch operating mechanism. During the initial angular movement of the handle, counterclockwise away from position H1, therefore, cam 103 swings in front of detent collar 102 and prevents return of shaft 101 to its locking position. There is no movement of the main operating lever 50 and no change in the position of the switch contacts. This initial movement, taking up the slack afforded by the spacing between the projections 78 and 79 of member 73 in the illustrated embodiment, is approximately 25°, although other angular relationships may be utilized as desired.

After shaft 54 has rotated through an angle sufficient to engage cam projection 79 on member 73 with cam pin 744, continued rotation of the handle initiates counterclockwise rotation of the cam follower plates 75 and 76. As the cam follower plate 75 turns counterclockwise, the pivotal connection from the plate to drive rod 62 lifts the left-hand end of the drive rod, as seen in FIG. 4, and also pushes the drive rod outwardly of housing aperture 61. The axial movement of the drive rod causes increased compression of spring 53, which is under slight compression even in the limiting position shown in FIG. 4.

Continuing the counterclockwise rotation of the handle, which now results in corresponding counterclockwise rotation of cam plates 75 and 76, brings the stop pin 85 into engagement with the lower surface of the main switch operating lever 50. As can be seen from FIG. 4, a substantial angular movement of cam plate 75 is necessary to engage stop pin 85 with lever 50. In the illustrated construction, this angular movement is approximately 32°, in addition to the initial 25° movement required to initiate angular movement of cam follower 75.

Before stop pin 85 engages lever 50, however, the pivotal connection 88 between cam follower plate 75 and drive rod 62 passes the line of alignment between the axis of shaft 54 and the fulcrum 63 for the drive rod. As soon as the drive rod moves past this alignment, continued rotation of the cam member 75 begins to move the pivot pin 88 away from the fulcrum 63. Thus, the over center toggle mechanism 52 afforded by drive rod 62, spring 53, and pivotal connection 88 has moved past its center and the spring 53 now drives the cam follower plate 75 in the same direction as that in which it is impelled by the rotational movement of the handle. From this over center position, the spring 53 exerts a strong driving force compelling the cam plates 75 and 76 to rotate rapidly in a counterclockwise direction. The passage over center of toggle mechanism 52 occurs after the handle has rotated through an angle of about 45° to the position H3 in FIG. 3. From that point, the spring 53 becomes the dominant factor in the movement of the operating mechanism 44. It is thus seen that the counterclockwise movement of lever 50 from the open switch position of FIG. 4 to the closed switch position of FIG. 3 is completely spring-driven. As a consequence, lever 50 is moved upwardly very rapidly and the movable contacts of the switch 10 (FIG. 1) are closed in a single swift movement of the actuating bar 35.

Once the switch is completely closed, with the mechanism 44 in the condition illustrated in FIG. 3. Collar 102 is released from its trapped position behind cam 103 and is driven by spring 108 back to its locked position as shown in FIG. 2. The shaft moves back to its original position as shown in solid lines in the drawing and can again be locked in that position. With the detent shaft 101 in its normal position, the detent collar 102 prevents any substantial angular movement of cam 103, as is clearly apparent from FIGS. 2, 3 and 4. Cam 103 is secured to shaft 54 for rotation therewith, so that locking up of the detent mechanism 100 positively prevents throwing of the switch.

The final position of the handle H, with the switch closed, is indicated in FIG. 3 by the phantom line H4. To open the switch, the operator first releases detent mechanism 100 as described above and turns handle H clockwise until collar 102 is trapped by the cam member 103. He is then free to use both hands for clockwise movement of the handle to open the switch. As the handle is brought to the fully open position it is again locked when collar 102 is released from its trapped position behind cam 103 and is spring driven axially into a position that blocks cam 103 and thereby locks shaft 54, as shown in FIG. 2.

During the initial clockwise movement of the handle from its position H4, FIG. 3, the cam member 73 rotates clockwise until the projection 78 engages cam pin 74. Again, this rotational movement, for the illustrated mechanism is approximately 25°, but this specific angular relationship is not critical, as long as some appreciable slack is provided. As soon as lug 78 engages pin 74, the cam follower plates 75 and 76 begin to move in a clockwise direction, driving rod 62 to the right and downwardly from the position of FIG. 3 toward that of FIG. 4. During the initial portion of this movement, while the left-hand end of rod 62 is still above the center of shaft 54, the rod moves to the right and spring 53 is compressed.

Continuing clockwise movement of the handle and of shaft 54 brings stop pin 84 into engagement with the upper surface of operating lever 50. This occurs after approximately an additional 32° of rotational movement of the cam follower plates 75 and 76, subsequent to the initial movement necessary to take up the slack between the cam lugs 78 and 79. In this instance, however, the stop member 84 engages lever 50 before the toggle mechanism comprising spring 55 and drive rod 62 reaches its center position. Thus, the initial downward or clockwise movement of lever 50 is carried out through a direct manually operated connection from the handle to the operating lever without assistance from spring 53. In fact, it occurs while spring 53 is still resisting the rotational movement of the handle and connecting linkage.

On the clockwise movement of the handle, the toggle mechanism reaches its center with the handle approximately at the orientation indicated by the phantom line H3. The linkage is so constructed that this position is reached just before the blades of the switch begin to move clear of their mating fixed contacts. At this point, the toggle mechanism snaps over center, the spring 53 expands and adds its force to the manual force exerted by the operator, and the switch snaps open very rapidly. Thus, maximum speed in opening of the switch contacts is achieved at the critical time when the movable contacts are ready to clear the fixed contacts of the switch.

Engagement of lever 50 with the bottom of housing 55 establishes the limit of movement for the switch-open condition of mechanism 44. The switch-closed limit is determined by the closing of the switch blades halting the upward swing of the operating lever.

When closing or opening the switch, using operating mechanism 44, the lost motion means 72 protects the operator against a sudden shock and possible injury when the over center toggle means 52 passes its center position and releases the spring to drive the mechanism. Because there is no direct driving connection between the handle and the toggle spring mechanism, the spring mechanism can move through a substantial arc, once the spring drive is initiated, without a corresponding abrupt movement of shaft 54 or handle H. It is thus seen that operating mechanism 44 affords substantial protection to the operator despite the fact that it provides a positive and very rapid make and break operation.

The amount of slack afforded by the lost motion mechanism 72 should be substantial. In the illustrated embodiment of the invention, the lost motion covers a range of approximately 25° of angular movement of handle H and shaft 54. This can be reduced somewhat or can be increased but it is preferred that the lost motion be at least approximately 15°.

Movement of the switch to full open or full closed position is accomplished by the spring action of the over center spring means 52 of the operating mechanism 44. On the other hand, if the switch does not quite complete its opening or closing movement, it is easily possible for the operator to finish the job by continuing the movement of handle H in the proper direction, taking up all slack and subsequently driving the switch mechanism home to the desired position. The detent mechanism 101 cannot be locked up unless handle H is in its full open or full closed position, so that the operator knowns if any final push is necessary to completely open or close the switch.

As described above, the operating cycles for the opening and closing movements of switch 10, under the control of operating mechanism 44, are substantially different. The difference is established by the locations of the stop pins 84 and 85. Thus, stop pin 85 is displaced from lever 50 through a substantially larger angle than is stop pin 84, as can be seen by comparison of FIGS. 3 and 4. It is this differential in alignment of the stop pins that provides for initial manual unlatching of the switch blades before the spring toggle mechanism takes over to rapidly open the switch contacts, whereas the complete closing movement of the switch is effected as a rapid spring movement. The releasing or unbolting of the switch contacts is preferably maintained as a manual operation, directly under control of the operator, as described, to avoid sudden shock to the latching mechanisms as might be occasioned if full spring action were used for opening movement as in the case of the switch closing movement. The full use of spring driving moving to close the switch is desirable because it assures the most rapid action and also provides for full and immediate clamping or latching of the switch contacts.

This arrangement fulfills another purpose in that it establishes a differential in the energy required to close and to open the switch. The independent control of the magnitude of energy applied by the switch operator 44 is desirable in that it assures adequate energy for the closing and clamping operation of the switch but avoids excessive slamming of the switch during an opening operation. Typical values for the dual toggle mechanism illustrated in FIG. 2, as applied to a 600-volt 3000-ampere vertically mounted three pole switch are 450 lb.-inches for closing and 200 lb.-inches for opening.

It is also noteworthy that the switch operating mechanism 44 affords substantial protection against operator error in failing to complete opening or closing operation with respect to the switch. It is virtually impossible for the switch operator to stop the switch action once the over center spring mechanism 52 has passed its center point in either direction. Consequently, the operator cannot interrupt an opening or closing movement at a position where the switch blades are nearly but not quite closed, which presents a quite dangerous condition. The switch operating mechanism 44 is described and illustrated as being mounted on the front of the switch but it can be re-located at the side of the switch if desired by modifying the linkage connecting the operating mechanism to the switch blades. Other modifications are also quite possible. Thus, the dual-projection cam 73 and single cam follower pin 74 can be readily replaced by a single projection cam with the single cam projection located between two spaced follower pins to give directly equivalent operation.

FIGS. 5 through 10 illustrate a switch operating mechanism 44A incorporated in a load break switch arranged for both manual and motor actuation. The mechanism 44A is essentially the same as mechanism 44 described above but with minor modifications set forth more fully hereinafter. As shown in FIG. 9, a door D is mounted across the face of the switch 10, covering the fuses of the switch. The lower portion of door D extends between handle H and the front wall 56 of the housing of switch operating mechanism 44A. As indicated in FIG. 9, when handle H is in position H', with switch open, door D can be opened for servicing of the switch as by replacement of the fuses. On the other hand, when handle H is in its closed position, with switch 10 closed, door D cannot be opened because its movement is blocked by the handle. Furthermore, when door D is open, and projects outwardly away from the base 11 of switch 10, handle H cannot be moved to the switch-closed position because its pivotal movement is blocked by the door. Thus, door D and handle H afford an effective mechanical interlock that prevents closing of switch 10 when the door is open and that prevents opening of the door when the switch is closed.

Referring to FIGS. 5 through 9, there is shown a linkage for connecting the main shaft 54 of switch operating mechanism 44A to an electrical motor means comprising a drive motor 343. The connecting linkage comprises a connecting lever 284 that is affixed to an extension 54B of shaft 54 (FIGS. 5, 6) that projects beyond the inner wall 57 of the mechanism housing. Connecting lever 284 is pivotally connected by a pivot pin 287 to a connecting link 293. Link 293 extends downwardly adjacent the rear wall 57 of the housing of the switch operating mechanism and is connected by a pin 286 to a double-armed crank 285. Crank 285 is rotatably mounted at its opposite end on the output shaft 275 of a gear unit 276. A double-ended drive lever 288 is affixed to shaft 275 intermediate the two arms of crank 285. Lever 288 is long enough to engage pin 286 as shown in FIGS. 6–8.

The opposite end of shaft 275 has affixed to it a cam 278. Cam 278 is aligned with and engages roller 334C on the end of an actuating arm for a single-pole double-throw sensing switch 334, switch 334 being mounted upon a bracket 233 (FIG. 6) that projects downwardly from the bottom of the switch operator mechanism housing.

Gear unit 276 is also mounted on the bottom of the housing for the switch operating mechanism. The gear unit is a part of a conventional gear motor, the motor portion being designated by reference numeral 343. Thus, shaft 275 is referred to hereinafter as the motor output shaft. Motor 343 may be provided with a solenoid brake if desired; however, dynamic braking is ordinarily used as described more fully hereinafter.

Referring to FIGS. 5 and 6, it is seen that member 103 (FIG. 2) has been omitted from switch operating mechanism 44A and is replaced by a limit switch drive lever 296 that is rotatably mounted upon shaft 54, being maintained in position between the two arms of operating lever 50 by a spacer 294. The left-hand portion of lever 296, as seen in FIGS. 5 and 7, is engageable with a roller 333C on the actuating arm of a single-pole double-throw sensing 333 that is mounted within the housing of switch operating mechanism 44. The opposite end of lever 296 is provided with a recess 298 that engages the central or bridge portion 50A of the main operating lever 50 in the operating mechanism. Thus, the angular position of lever 296 affords a direct indication of the operating condition of switch 10, since operating lever 50 directly controls the opening and closing of the electrical switch.

The remainder of the operating mechanism 44A (FIGS. 5–9) remains essentially unchanged from the contsruction 44 described above (FIGS. 1–4). However, cam follower plates 75B, 75C, 76B and 76C are changed slightly in configuration to avoid interference with operation of the switches and other electrical controls located in the left-hand portion of the housing for mechanism 44A.

The other functions of the cam follower plates and of the remainder of mechanism 44, however, remains unchanged.

In addition, drivers 73B and 73C are modified to straight, short, rectangular levers driving against pins 84 and 85, pins 74 being omitted. The function remains the same despite this minor change in detailed structure.

An interlock switch 335 is also mounted in the left-hand portion of the housing for the switch operating mechanism, as shown in FIGS. 5 and 7, being located immediately adjacent sensing switch 333. The opening and closing of interlock switch 335 is effected by means of a drive rod 337 that projects outwardly from the switch through the front wall 56 of the operating mechanism housing. The free end of rod 337 is positioned to be engaged by door D as shown in FIGS. 6 and 9.

Two indicator lamps 338 and 339 are located on the front wall 56 of the housing for switch operator mechanism 44A. Lamp 338 is energized to indicate that switch 10 is closed and may, for example, comprise a red colered indicator lamp. Lamp 339, which may be green in color, is energized to indicate that the switch 10 is open. Also mounted on the front wall 56 of the operating mechanism housing are two electrical pushbutton switches 210 and 211 employed to actuate the motor 343 for opening and closing of switch 10 as described more fully hereinafter.

A typical electrical operating circuit for the motor actuated version of switch operating mechanism 44, as described above in connection with FIGS. 5 through 9, is shown in FIG. 10. The circuit comprises two AC power lines 231 and 232 connected to a suitalbe AC supply, not shown. As shown in FIG. 10, interlock switch 335 is a single-pole single-throw switch having one terminal connected to the main bus 231 and having its other terminal connected to an auxiliary bus 233.

Sensing switch 333, as shown in FIG. 10, is a single-pole double-throw switch having a movable contact that is engageable with either of two fixed contacts 333A and 333B. The movable contact of switch 333 is electrically connected to the auxiliary bus 233. The fixed contact 333A of the switch is connected to one terminal of the "close" pushbutton switch 211, the other terminal of switch 211 being connected back to auxiliary bus 233. A pair of normally open relay contacts 220-1 are connected in parallel with the closing pushbutton switch 211.

Contact 333A of sensing switch 333 is also connected to the operating coil 220 of a closing relay, this being the operating coil for contacts 220-1 and all of the other contacts in FIG. 10 that begin with the reference numeral 220. The other terminal of coil 220 is connected through a pair of normally closed relay contacts 222-3 to one terminal 334B of sensing switch 334. Switch 334, like switch 333, is a single-pole double-throw device, the two fixed contacts of the switch being the terminals 334B and 334A. The movable contact of switch 334 is returned to the power line 332.

A further connection is made from contact 333A of sensing switch 333 through a pair of normally closed relay contacts 220-2 to the switch-closed indicator lamp 338. Lamp 338 is also connected to power line 232.

The circuit connections for the remaining fixed terminal 333B of the switch-position sensing switch 333 are similar to those described above for switch contact 333A. Thus, terminal 333B is connected to the "open" pushbutton switch 210, which is returned to the auxiliary bus 233. A pair of normally open relay contacts 222-1 are connected in parallel with switch 210. Terminal 333B is also connected to one terminal of a relay operating coil 222; coil 222 is the operating coil for a relay used to control opening operation of the switch operating mechanism and actuates all of the contacts having reference numerals which begin with 222. Coil 222 is connected through a pair of normally closed relay contacts 220-3 to terminal 334A of the motor shaft orientation sensing switch 334.

The switch-open indicator lamp 339 is connected between the sensing switch terminal 333B and the power line 232 in a circuit that includes, in series with the lamp, a pair of normally closed relay contacts 222-2.

For the circuit shown in FIG. 10, a motor 343 is a series motor having a field winding 343F and an armature 343A. One terminal of the field winding 343F is connected to auxiliary bus 233 through the parallel combination of a pair of normally open relay contacts 220-4 and a pair of normally open relay contacts 222-4. The other terminal of field winding 343F is connected through the parallel combination of two sets of normally open relay contacts 220-7 and 222-7 and through a resistor 235 to one terminal of armature 343A. The other terminal of armature 343A is connected to two sets of normally open relay contacts 220-6 and 222-6 that are returned to the power line 232. This same terminal of armature 343A is also connected back to the field winding 343F through the series combination of two pair of normally closed relay contacts 222-8 and 220-8.

The armature circuit further includes a connection from resistor 235 through two normally closed pairs of relay contacts 222-5 and 220-5 to field winding 343F.

In considering operation of the switch operating mechanism 44A as arranged for either manual or motor operation, and as shown in FIGS. 5-10, it may be assumed initially that door D is closed and the service switch 10 is in closed condition. Under these circumstances, the component parts of the operating mechanism and the linkage to the electric drive motor are all in the position shown in solid lines in the drawings, FIGS. 5-9. Moreover, the sensing switches 333 and 334 are in the operating position shown in FIG. 10, indicating that the orientation of motor output shaft 275 and of main operating lever 50 each corresponding to a "switch closed" condition. The interlock switch 335 is closed, since door D is closed.

To open switch 10 by means of electrical motor 343, the electrician presses to "open" pushbutton switch 210 (FIG. 9). The closing of switch 210 (FIG. 10) completes an energizing circuit for the opening relay coil 222, the circuit extending from bus 231 through switch 335 and switch 210 to coil 222 and then through normally closed relay contacts 220-3 and switch 334 to bus 232. Energization of coil 222 actuates all of the contacts in the 222 series.

Thus, contacts 222-1 close, establishing a holding circuit for relay coil 222 that is independent of the release of pushbutton switch 210. by the operator. Contacts 222-2 open so that indicator lamp 339 cannot yet be energized. Contacts 222-3 open, preventing energization of the closing relay coil 220. Contacts 222-5 and 222-8 open, opening a break circuit for motor 343 as described more fully hereinafter. Furthermore, contacts 222-4, 222-7 and 222-6 close, completing a series circuit for the motor field winding 343F and the motor armature 343A. Thus, motor 343 is energized and starts to rotate shaft 275 (FIGS. 6-8).

Shaft 275 rotates in a clockwise direction, as seen in FIG. 7, counterclockwise in the rear view of FIG. 8. Rotation of the shaft drives the double-end drive lever 288 clockwise (FIG. 7), forcing cranks 285 to pivot clockwise by virtue of the engagement of one end of lever 288 with pin 286. The clockwise rotation of crank 285 pulls connecting link 293 downwardly and to the the right, as seen in FIG. 7. This movement of connecting link 293 roatates connecting lever 284 in a clockwise direction and turns shaft 54 clockwise. It is thus seen that the operation of the motor, under these circumstances, initates rotation of the main shaft 54 of switch operating mechanism 44A from the switch-closed position of that shaft toward its switch-open position. The actual opening of the switch proceeds in the manner described in detail above, and is caused by the pivotal movement of the main lever 50 from its closed position to its open position as shown in FIGS. 3 and 4, respectively, in the essentially similar mechanism 44.

As the switch operating mechanism 44A, and particularly the main lever 50, nears its full open position, driven by the overcenter spring mechanism 52 as described above, limit switch drive lever 296, which is compelled to follow the movements of lever 50, engages roller 333C. See phantom outline 296A, FIG. 7, and outline 50B. Lever 296 pushes roller 333C inwardly toward the body of the switch and actuates the switch. This causes the movable contact of switch 333 to snap into engagement with switch terminal 333B, disengaging from contact 333A (FIG. 10). This deenergizes the "closed" indicator lamp 338 and also affords an alternative circuit in parallel with contacts 222-1, which are already closed.

Subsequently, howevre, after approximately 180° of rotation of gear motor shaft 275, cam 278 drives roller 334C inwardly toward sensing switch 334 (FIG. 7). This actuates switch 334 so that the movable contact of the switch is disengaged from the fixed contact 334A and closes upon contact 334B (FIG. 10). When this occurs the operating circuit to the opening relay coil 222 is broken and that rleay drops out.

Deenergization of coil 222 causes contacts 222–1 to open; this produces no immediate positive action within the circuit but prepares the circuit for subsequent operations. Contacts 222–2 close, establishing an operationg circuit to lamp 339, through switch 333. Energization of lamp 339 gives the operator a direct indication that the load break switch 10 has been opened. Relay contacts 222–3 close, preparing the circuit for a later operation. Contacts 222–4, 222–6, 222–7 all open, opening the energizing circuit to the motor as represented by armature 343A and field winding 343F in FIG. 10. At the same time, contacts 222–5 and 222–8 close, completing a circuit (including resistor 234) between armature 343A and field winding 343F that is independent of the power lines and that constitutes a dynamic braking circuit for the motor. Thus, the motor is stopped almost immediately.

For closing the switch electrically, the operating conditions for the electrical circuit are as illustrated in FIG. 10 except that switches 333 and 334 are in their alternate positions, having reached those positions upon opening of switch 10 as described immediately above. However, the switch operating mechanism 44A starts from its alternate or switch-open position as described in detail above, with lever 50 in the dash line position 50B shown in FIG. 7 corresponding to the position illusrtated in FIG. 4. To close switch 10 by electrical operation, the operator closes punshbutton switch 211, completing an energizing circuit for the closing relay coil 220. This energizing circuit, beginning at bus 231, extends through switch 335, pushbutton switch 211, coil 220, contact 222–3 and switch 334 to bus 232 (FIG. 10).

Upon energization of coil 20 as noted above, contacts 220–1 close, establishing a holding circuit for coil 220 that is independent of pushbutton switch 211. Contacts 220–2 open, preventing premature energization of indicator lamp 338. Contacts 220–3 open, preventing actuation of the opening relay coil 222. Contacts 220–5 and 220–8 open, opening the dynamic brake circuit for motor 343. Furthermore, contacts 220–4, 220–6, and 220–7 all close, completing a series circuit for the motor field winding 343F and the armature 343A, again energizing the motor.

Motor 343, when energized, again drives the output shaft 275 of gear unit 276 in a clockwise direction as seen in FIG. 7. In this instance, the resulting clockwise movement of the double-ended lever 288 pushes pin 286 upwardly, rotating drive crank 285 back toward its original position as shown in the drawings. The resulting upward movement of connecting link 293 drives lever 284 back in a counterclockwise direction, rotating a shaft 54 in a counterclockwise direction from its switch-open position toward its switch-closed position.

As the switch operating mechanism 44A, and particularly the main lever 50 of that mechanism, approaches the switch-closed position, lever 296 moves clear of roller 333C. Consequently, switch 333 is actuated from engagement with its contact 333B back to its contact 333A (FIG. 10). This produces no immediately operating change in the circuit.

After approximately 180° of rotation of shaft 275, cam 278 again permits roller 334C to move away from switch 334. Consequently, sensing switch 334 snaps from engagement with its contact 334B to its contact 334A (FIG. 10). This opens the operating circuit for the switch-closing relay coil 220 and deenergizes that relay.

When coil 220 is deenergized, contacts 220–1 open. This prepares the circuit for subsequent operations. Contacts 220–2 close, energizing lamp 338 to afford a direct indication to the operator that the load break switch 10 is in closed condition. Contacts 220–3 close to prepare the circuit for a later switch-opening operation. Contacts 220–4, 220–6, and 220–7 open, opening the energizing circuit for armature 343A and field winding 343F. The dynamic brake circuit for the motor is completed by the closing of contacts 220–5 and 220–8, halting the motor promptly with the double end lever 288 in the position shown in the drawings.

In some instances, and particularly if the opening and closing pushbutton switches 210 and 211 are located at a position remote from the switch itself, or in the event that there is some malfunction of the electrical drive for the switch operating mechanism, an electrician may desire to throw switch 10 manually, using handle H. To accomplish this end, the electrician simply throws handle H from its closed position to its open position H' in the manner described above and as indicated by FIGS. 1 and 9.

When the operating mechanism is thrown manually, the resultant clockwise rotation of the main operating lever 50 pivots lever 296 into engagement with roller 333C and actuates sensing switch 333. Thus, switch 333 is thrown from the position shown in the schematic drawing, FIG. 10, disengaging its contact 333A and closing upon its contact 333B. This movement of sensing switch 333 completes an energizing circuit for opening relay coil 222. This initiates the same sequence of operations as described above, including energization of motor 343 and subsequent de-energization of the motor through actuation of sensing switch 334 upon rotation of the gear unit shaft 275 through an angle of approximately 180°. Thus, the motor is automatically energized to rotate the double-ended lever 288 to catch up with the position of pin 286 resulting from the movement of the linkage comprising lever 284, link 293, and crank 285 that has been caused by manual actuation of switch operating mechanism 44A. The sequence of opreations is exactly the same as for electrical operation except that the motor is driven to catch up with the position of the switch operating mechanism instead of driving that mechanism.

The same result is achieved when a workman closes the switch manually by actuation of handle H. In this instance the motor circuit is effectively closed by actuation of switch 333 to complete an energizing circuit for relay coil 220. The energization of coil 220 actuates the closing relay contacts to energize motor 343 in the same manner as by closing of pushbntton switch 211, described above. Again, motor 343 drives gear unit 276 until the double-ended lever 288 catches up with the postion of pin 286, readying the mechanism for a subsequent operation of either a manual or motor driven nature.

From the foregoing description, it will be seen that the linkage connecting gear motor shaft 275 with the main shaft 54 of switch operating mechanism 44 translates rotational movement of the drive crank 285 into a reciprocating motion of the drive lever 284. That is, the drive lever 284 is driven clockwise (FIG. 7) to open the load break switch 10 and is driven counterclockwise to close the load break switch, although the initial element in the drive linkage, crank 285, rotates only in a clockwise direction.

The linkage connecting the gear motor shaft with the switch operating mechanism permits manual opening and closing of load break switch 10 with no interference whatsoever by the gear motor driving unit. There is no necessity for engagement or disengagement of a clutch as required in some conventional devices. Through the choice of an appropriate gear ratio, any possibility of harm to the operator is effectively eliminated, since the movement of shaft 54 can be and is made quite slow and there is no danger that an electrician will be harmed by rapid actuation of the handle H due to rotation of shaft 54 at a time when he is about to throw the switch manually. On the other hand, motor 343 and lever 288 are always automatically actuated to bring the mechanism into a ready condition for further electrical operation, despite the fact that the mechanism may have been actuated manually. This is made possible by use of the separate sensing switch 334 and the cam 278 keyed to the output shaft 275 of the gear motor.

The indicating lamps 338 and 339 always show the actual operating position of the load break switch 10, since operation of these lamps is controlled by sensing switch 333 which is in turn actuated in accordance with the position of the main operating lever 50 of the switch operating mechanism. Stated differently, the indicator lamps are not energized in accordance with the operating position of the motor shaft, but are directly controlled in relation to the operating condition of the load break switch 10. Thus, there is a clear indication of the operating position of the load break switch afforded both by the indicator lamps 338 and 339 and by the position of handle H.

Even if motor 343 has been energized, there is no harm to the mechanism if a workman throws the switch by manual actuation of handle H. All that happens is that the switch operating mechanism gets ahead of the motor and the motor subsequently catches up as described above for manual operation.

Double-ended lever 288 is an important element in the connecting linkage for the motor drive of the switch operating mechanism. In both the motor and the manually actuated operations of mechanism 44A, the mechanism moves well ahead of the motor drive linkage when the overcenter spring drive passes its toggle point. The end of lever 288 normally free of pin 286 prevents crank 285 from reaching and stopping at a dead-center point for the linkage 284, 285, 293, which otherwise might jam the linkage and prevent subsequent manual operation of mechanism 44A. Emergency manual operation is always possible in the event of loss of motor power from deenergized bus 231, open interlock switch 335, FIG. 10, or other causes, since the double ended lever allows crank 285 to swing freely from switch open to switch closed position or switch closed to switch open position without interference with the motor linkage. When voltage is restored to bus 233, nothing happens if the motor position agrees with the switch position, but if the switch and motor positions are not in agreement, switches 333 and 334 will both be closed upward or downward so as to complete the circuit to run the motor until switch 334 snaps over indicating that the motor position agrees with the position of the main switch blades 28 and 29 of FIG. 1.

In the control circuit, FIG. 10, there are a number of changes that may be made. For example, the dynamic brake circuit can be replaced with a conventional solenoid brake for the motor. Separate indicator lamps for the motor orientation, based on operation of sensing switch 334, can be used. These revisions, and others of similar nature, do not change the basic operation of the mechanism.

What is claimed is:

1. A clutchless switch operating mechanism for opening and closing the movable contacts of a load break pressure contact switch by manual or motor actuation, comprising:
   a main shaft;
   a handle attached to said main shaft for rotating said main shaft, in opposed directions, between a switch-open and a switch-closed positon;
   overcenter spring means actuatable past a center point in two opposite directions to drive said switch contacts to open and closed positions, respectively, continuously indicating switch position;
   lost-motion connection means interconnecting said main shaft, said movable switch contacts, and said overcenter spring means, for actuating said overcenter spring means in response to movements of said shaft between switch-open and switch-closed positions;
   electric motor means having an output shaft;
   a connecting linkage mechanically connected to said motor output shaft and to said main shaft for rotationally reciprocating said main shaft between its switch-open and switch-closed positions and back in response to successive rotational movements of said motor output shaft, in the same direction, through angles of the order of 180°, said connecting linkage including a unidirectional drive connection permitting free movement of said main shaft without corresponding movement of said motor output shaft; and
   electrical circuit means for automatically energizing said motor to orient said motor shaft angularly with said main shaft, said electrical circuit means including a first sensing device for sensing the angular orientation of said motor output shaft and a second sensing device for sensing the orientation of a part of said lost-motion connection means.

2. A switch operating mechanism according to claim 1 in which said connecting linkage comprises:
   a crank rotatably mounted on said motor output shaft;
   a double-ended drive lever affixed to said motor output shaft for rotation therewith and engageable with said crank to rotate said crank, but permitting rotation of said crank independently of rotation of said drive lever upon manual actuation of said operating mechanism, through an angle of less than 180° to prevent said linkage from reaching a dead center position;
   a connecting lever affixed to said main shaft;
   and a connecting link having its opposite ends pivotally connected to said crank and said connecting lever respectively.

3. A switch operating mechanism according to claim 1 in which each of said sensing devices comprises a double-throw switch having one operating condition corresponding to a switch-open orientation and a second operating condition corresponding to a switch-closed orientation, said circuit means further comprising control relay means for energizing said motor means whenever said sensing switches are in different operating conditions and for de-energizing said motor means whenever said sensing switches are in the same operating condition, and manually operable actuating switch means, in parallel with one of said sensing switches for actuating said control relay means to effect motor actuation of said mechanism.

4. A swtich operating mechanism according to claim 2 in which each of said sensing devices comprises a double-throw switch having one operating condition corresponding to a switch-open orientation and a second operating condition corresponding to a switch-closed orientation, said circuit means further comprising control relay means for energizing said motor means whenever said sensing switches are in the same operating condition, and manually operable actuating switch means, in parallel with said second sensing switch for actuating said control relay means to effect motor actuation of said mechanism.

5. A switch operating mechanism for opening and closing the movable contacts of a load break pressure contact switch, comprising:
   a main shaft;
   a handle attached to said main shaft for rotating said shaft, in opposed directions, between a switch-open position and a switch-closed position;
   a cam member affixed to said main shaft for rotation therewith;
   a cam follower member rotatably mounted on said shaft, one of said cam and cam follower members including a first cam projection extending between two spaced cam projections on the other member, said cam projections being engageable to drive said cam follower member over a predetermined arcuate range in response to movement of said shaft between its switch-open and switch-closed positions, the spacing between said two spaced cam projections being substantially greater than the width of said first cam projection to afford substantial lost motion in the driving connection between said cam member and said cam follower member;

an operating lever rotatably mounted on said shaft and mechanically connected to said movable switch contacts;

said cam follower member having first and second spaced drive projections thereon engageable with opposite sides of said operating lever to drive said operating lever between contact-open and contact-closed positions in response to movement of said cam follower member to the opposite ends of its arcuate range, the spacing between said drive projections being substantially greater than the effective width of said operating lever to afford substantial lost motion in the driving connection between said cam follower member and said operating lever, which lost motion is cumulative with respect to the aforesaid lost motion between said cam member and said cam follower member;

one of said drive projections being located to engage said operating lever before said drive rod is moved past its centered alignment as said shaft moves from switch-closed to switch-open position, and the other of said drive projections being located to engage said operating lever only after said drive rod is moved past its centered alignment as said shaft moves from switch-open to switch-closed position;

and over center spring means comprising a drive rod pivotally connected at one end to a predetermined connection point on said cam follower member, said drive rod further being pivotally and slidably engaged, near its opposite end, with a fulcrum located on a line extending from the axis of said pivot through an intermediate point in the arc described by said cam follower member connection point as said cam follower member moves through its aforesaid arcuate range;

said over center spring means further comprising a compression spring mounted on said drive rod for maximum compression upon movement of said cam follower member connection point from either end of said arcuate range to said intermediate point, said compression spring expanding to drive said cam follower member to either end of its arcuate range and to thereby drive said operating lever to one of its contact-open and contact-closed positions upon movement of said drive rod past a centered alignment with said fulcrum and said shaft axis.

6. A clutchless switch operating mechanism for both manual and motor operation of a load break pressure contact switch of the kind comprising at least one fixed contact and at least one movable contact operable over a predetermined range of movement between a full-closed position and a full-open position, said fixed and movable contacts engaging each other over a given initial portion of said range beginning at said full-closed position, said operating mechanism comprising:

a main shaft, rotatable in opposed directions between a switch-open position and a switch-closed position;

over center spring drive means, connected to said movable contact and actuatable in two opposite directions relative to a center point, for driving said movable switch contact to its open and closed positions, when actuated past said center point, depending upon the direction in which said over center spring drive means is actuated;

connection means, mechanically interconnecting said main shaft with said movable contact and with said over center spring drive means, including a main operating lever rotatably mounted on said main shaft and connected to said movable switch contact, for directly driving said movable contact through said initial portion of its movement range without assistance from said overcenter spring drive means, and for actuating said over center spring drive means in response to movements of said main shaft between said switch-closed and switch-open positions to drive said movable contact through the remaining portions of its movement range, said over center spring means further being effective to drive the movable switch contact from switch-open to switch-closed position, said connection means affording substantial lost motion between said main shaft and said movable contact and between said main shaft and said over center spring means for both directions of movement of said shaft;

a handle affixed to said main shaft for manual actuation of the mechanism and affording a continuous indication of the operating condition of the switch;

electric motor means having an output shaft driven in only one direction;

a connecting linkage means, mechanically connected to said motor output shaft and to said main shaft, for rotationally reciprocating said main shaft between said switch-open and switch-closed positions in response to continuing rotational movement of said motor output shaft in said one direction, successively, through angles of the order of 180°, said connecting linkage means including a unidirectional drive connection permitting free movement of said main shaft without corresponding movement of said motor output shaft; and electrical circuit means for automatically energizing said motor to orient said motor shaft angularly with said main shaft, said electrical circuit means including two sensing devices, one for sensing the angular orientation of said motor output shaft and the other for sensing the angular orientation of said main operating lever.

7. A switch operating mechanism according to claim 6 in which said connecting linkage comprises:

a crank rotatably mounted on said motor output shaft;

a drive lever affixed to said motor output shaft for rotation therewith and engageable with said crank to rotate said crank, but permitting rotation of said crank independently of rotation of said drive lever upon manual actuation of said operating mechanism;

a connecting lever affixed to said main shaft;

and a connecting link interconnecting said crank and said connecting lever.

8. A switch operating mechanism according to claim 7 in which said drive lever is a double-ended lever limiting rotational movement of said crank, during manual actuation of the mechanism, to less than 180°, to prevent said linkage from reaching a dead center position.

References Cited

UNITED STATES PATENTS

| | | |
|---|---|---|
| 1,801,866 | 4/1931 | Jennings. |
| 1,835,982 | 12/1931 | Hammerly. |
| 2,025,682 | 12/1935 | Frese. |
| 2,726,363 | 12/1955 | Scully. |
| 3,234,803 | 2/1966 | Caswell et al. _____ 335—76 |
| 3,236,967 | 2/1966 | Bottonari et al. _____ 335—76 |

ROBERT K. SCHAEFER, Primary Examiner

D. SMITH, Jr., Assistant Examiner

U.S. Cl. X.R.

200—67; 335—26, 27; 337—8, 143